United States Patent
Steidl et al.

(10) Patent No.: US 9,456,017 B2
(45) Date of Patent: Sep. 27, 2016

(54) SYSTEM AND METHOD FOR A CONNECTOR BEING ABLE TO ADAPT TO NEWER FEATURES INTRODUCED TO A MESSAGING PROVIDER WITH ONLY CONFIGURATION CHANGES

(71) Applicant: Oracle International Corporation, Redwood Shores, CA (US)

(72) Inventors: Jefferey Steidl, Portland, OR (US); Vivekananda Maganty, Portland, OR (US); Thomas E. Barnes, Whitehouse Station, NJ (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 13/872,797

(22) Filed: Apr. 29, 2013

(65) Prior Publication Data

US 2013/0290453 A1    Oct. 31, 2013

Related U.S. Application Data

(60) Provisional application No. 61/793,043, filed on Mar. 15, 2013, provisional application No. 61/793,257, filed on Mar. 15, 2013, provisional application No. 61/793,459, filed on Mar. 15, 2013, provisional application No. 61/800,016, filed on Mar. 15, 2013, provisional application No. 61/799,391, filed on Mar. 15, 2013, provisional application No. 61/639,786, filed on Apr. 27, 2012, provisional application No. 61/639,791, filed on Apr. 27, 2012.

(51) Int. Cl.
| | |
|---|---|
| *G06F 3/00* | (2006.01) |
| *G06F 9/44* | (2006.01) |
| *G06F 9/46* | (2006.01) |
| *G06F 13/00* | (2006.01) |
| *H04L 29/08* | (2006.01) |
| *H04L 12/58* | (2006.01) |
| *G06F 9/54* | (2006.01) |

(52) U.S. Cl.
CPC .............. *H04L 67/00* (2013.01); *G06F 8/30* (2013.01); *G06F 9/541* (2013.01); *G06F 9/546* (2013.01); *H04L 51/06* (2013.01); *H04L 67/1002* (2013.01); *G06F 2209/547* (2013.01)

(58) Field of Classification Search
None
See application file for complete search history.

(56) References Cited

U.S. PATENT DOCUMENTS

| | | | | |
|---|---|---|---|---|
| 6,578,191 | B1* | 6/2003 | Boehme ................. | G06F 9/541 717/106 |
| 7,418,711 | B1* | 8/2008 | Lee et al. ...................... | 719/314 |
| 7,472,401 | B2* | 12/2008 | Luo et al. ..................... | 719/330 |
| 7,739,699 | B2* | 6/2010 | Andreeva et al. ........... | 719/330 |
| 7,752,484 | B2* | 7/2010 | Goetz ............... | G06F 17/30286 714/2 |
| 8,656,413 | B2* | 2/2014 | Goetz ............... | G06F 17/30557 709/217 |
| 2002/0116454 | A1* | 8/2002 | Dyla ..................... | G06Q 30/06 709/203 |
| 2004/0015784 | A1* | 1/2004 | Chidlovskii ...... | G06F 17/30893 715/255 |
| 2005/0210108 | A1* | 9/2005 | Covert et al. ................. | 709/206 |
| 2006/0259517 | A1* | 11/2006 | Urscheler ......... | G06F 17/30581 |
| 2008/0148292 | A1* | 6/2008 | Goetz ............... | G06F 17/30557 719/320 |
| 2008/0155320 | A1* | 6/2008 | Goetz ............... | G06F 17/30286 714/15 |

\* cited by examiner

*Primary Examiner* — Reginald Bragdon
*Assistant Examiner* — Kacy Verdi
(74) *Attorney, Agent, or Firm* — Marger Johnson (57) ABSTRACT

A computer-controlled method can include providing a resource adapter with an object wrapper having a plurality of features, a wrapper generation tool receiving a change to be made to the object wrapper, and the wrapper generation tool generating a new object wrapper based on the change. The resource adapter can receive an object from a messaging provider, adapt the object based on the newly generated object wrapper, and send the wrapped object to an application.

23 Claims, 5 Drawing Sheets

SYSTEM AND METHOD FOR A CONNECTOR BEING ABLE TO ADAPT TO NEWER FEATURES INTRODUCED TO A MESSAGING PROVIDER WITH ONLY CONFIGURATION CHANGES

CROSS-REFERENCE TO RELATED APPLICATIONS

This application claims benefit of provisional patent applications 61/639,786, and 61/639,791, both filed Apr. 27, 2012; and provisional patent applications 61/793,043, 61/793,257, 61/793,459, 61/800,016, and 61/799,391, all filed Mar. 15, 2013, all incorporated by reference herein their entirety.

This application is related to the following co-pending US Patent Application Nos, all filed Apr. 29, 2013, all incorporated by reference herein in their entirety:

Ser. No. 13/872,976 "SYSTEM AND METHOD FOR CLUSTERED TRANSACTIONAL INTEROPERABILITY OF MULTIPLE MESSAGING PROVIDERS USING A SINGLE CONNECTOR MECHANISM;"

Ser. No. 13/872,899 "SYSTEM AND METHOD FOR CLUSTERED TRANSACTIONAL INTEROPERABILITY OF PROPRIETARY NON-STANDARD FEATURES OF A MESSAGING PROVIDER USING A CONNECTOR MECHANISM;"

Ser. No. 13/872,919 "METHOD FOR A CONNECTOR PROVIDING TRANSACTIONAL INTEROPERABILITY TO MULTIPLE MESSAGING PROVIDERS TO MULTIPLE APPLICATION SERVERS USING THE SAME IMPLEMENTATION;"

Ser. No. 13/872,822 "DYNAMIC CODE GENERATION TO DYNAMICALLY CREATE AND DEPLOY MESSAGING PROVIDER-SPECIFIC WRAPPERS FOR A RESOURCE ADAPTER."

BACKGROUND

Currently, once a connector has been released to a production environment, any changes made to the environment require any of a number of additional steps. For example, if a user makes changes to the environment, e.g., by using an updated messaging provider which adds new features such as new headers or fields or different behavior, then the connector would need to be updated to take advantage of the newly added features. Also, a new connector may need to be provided.

Accordingly, there remains a need for a way to address these and other deficiencies associated with the prior art.

DETAILED DESCRIPTION

In accordance with an embodiment, a dynamically adaptable connector is provided which can adapt to new features and provide, without having to provide the user with a new connector or new code. For example, when a user upgrades their environment, configuration files can be changed in view of the new features and the connector is dynamically updated to support the new features. There is no precedent for a connector being able to adapt to newer features introduced to a messaging provider with only configuration changes. This is achieved through messaging-specific static code generation, using a static code generation tool.

Among the various advantages resulting from certain implementations of the disclosed technology is that a given application may make use of the new features of a messaging provider—not only those that improve performance but also those that may provide virtually any benefit such as increased reliability, control, and customizability—without having to wait, potentially indefinitely, for the original provider to create and distribute new wrappers that expose the new features.

Such features may resulting in not only the saving of time—thus possibly allowing a user to bring their application on-line or to market faster—but also a decrease in their risk exposure because, since they may now generate their own new wrappers or the messaging provider comes with such updated wrappers, they are no longer dependent on the original provider to provide them with updated wrappers.

In addition to the case of an existing messaging provider being updated with new features, there is also the case of an entirely new messaging provider being created, e.g., with its own provider-specific features, such that a user could generate wrappers for the new messaging provider—and thereby access the provider-specific features—even if no one at the original provider has ever heard of the new messaging provider.

Figure 1:
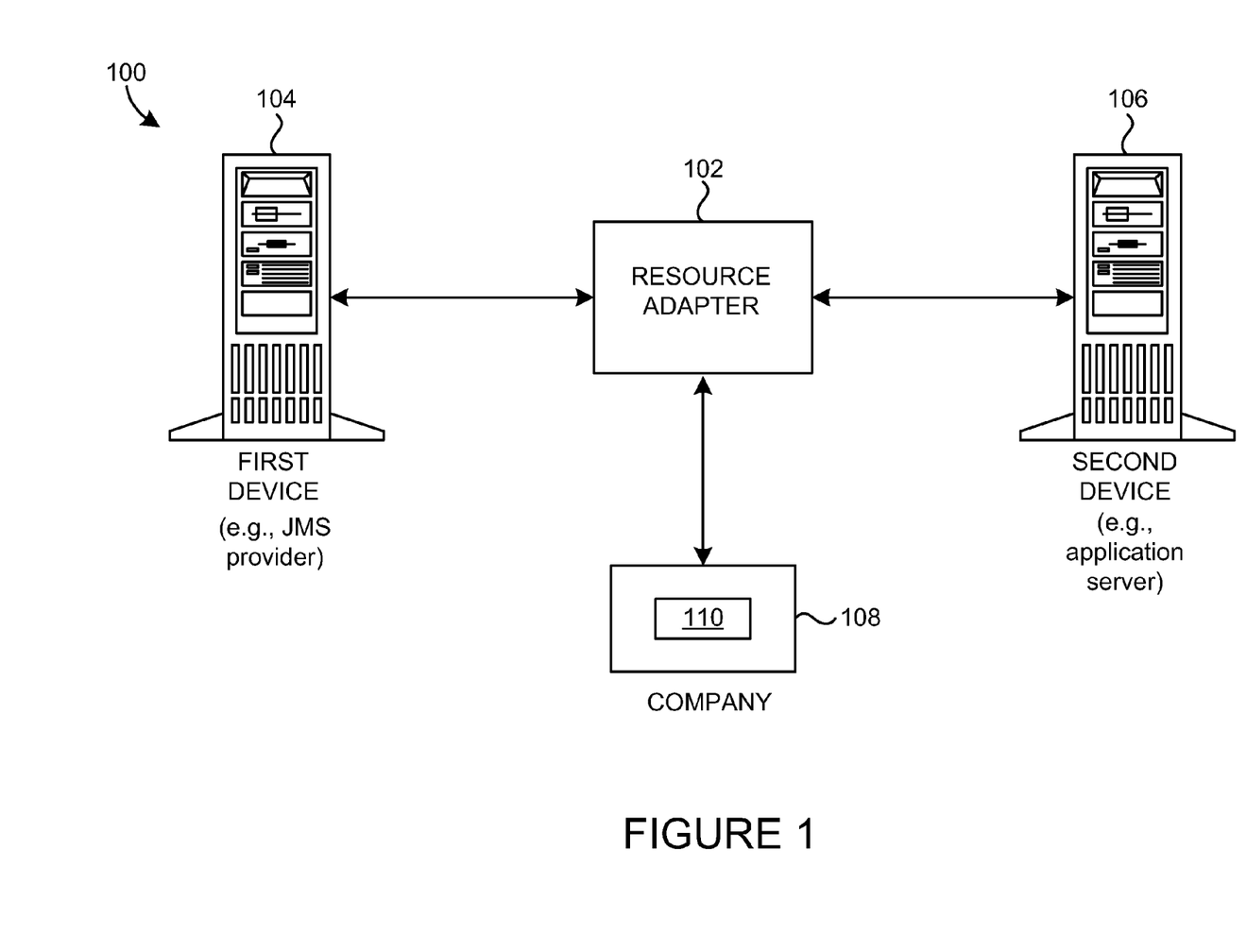
FIG. 1 illustrates a first example of a system in accordance with certain implementations of the disclosed technology.

FIG. 1 illustrates a first example of a system 100 in accordance with certain implementations of the disclosed technology. In the example, a resource adapter 102 is communicatively coupled between a first device 104 and a second device 106. In certain embodiments, the first device 104 is a Java™ Messaging Service (JMS) provider configured to provide an object to the resource adapter and the second device 106 is an application server hosting an application.

In the example, a wrapper generation tool 110 is managed by a company 108. The company 108 may use the wrapper generation tool 110 to generate a plurality of wrappers, each of which is specific to one of a plurality of messaging providers, for example. The company 108 may subsequently supply wrappers for use with the resource adapter 102 and the messaging providers.

Figure 2:
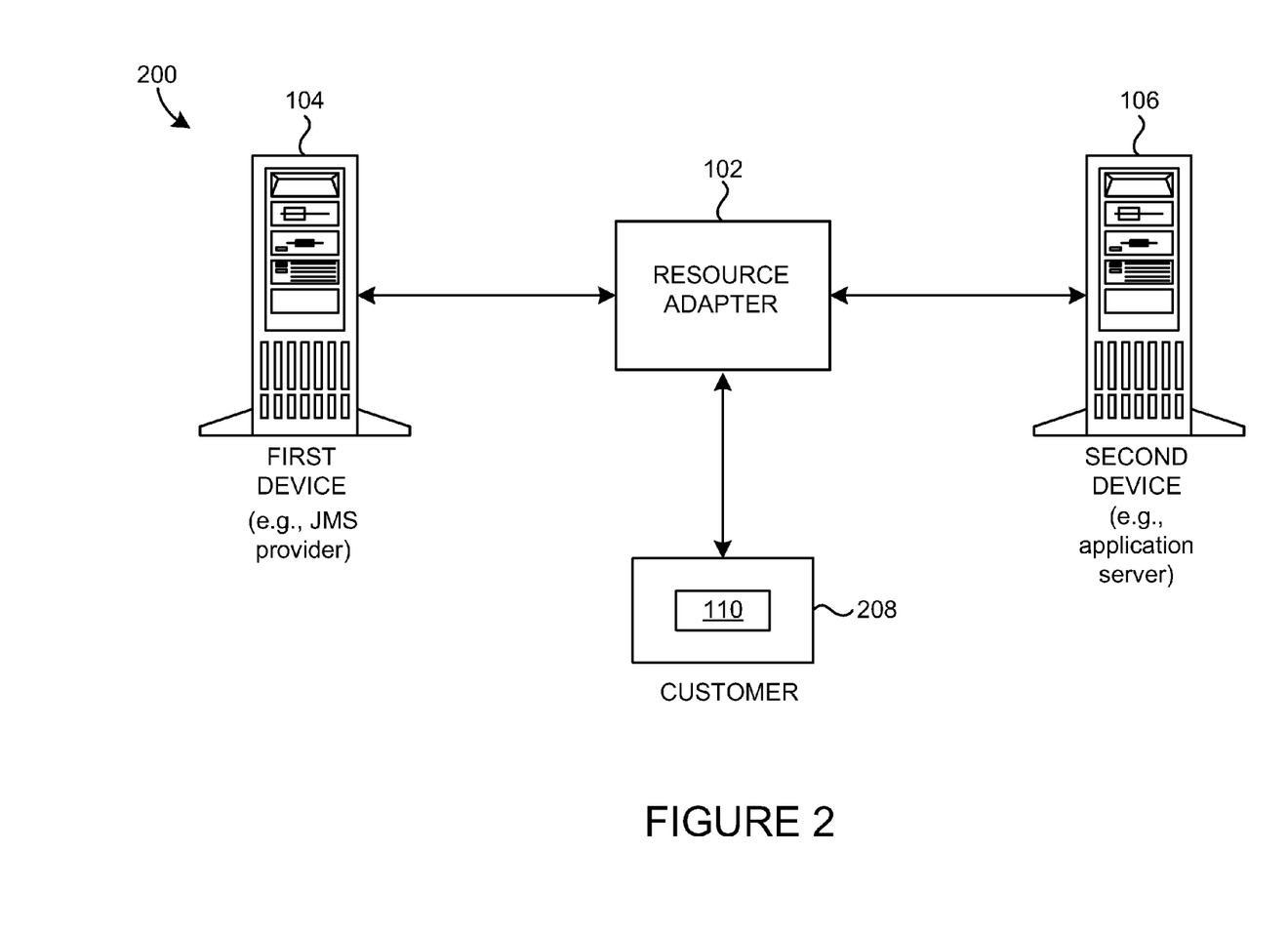
FIG. 2 illustrates a second example of a system in accordance with certain implementations of the disclosed technology.

FIG. 2 illustrates a second example of a system 200 in accordance with certain implementations of the disclosed technology. In the example, the system 200 includes the resource adapter 102, first device 104, and second device 106 of the system 100 illustrated by FIG. 1.

Unlike the system 100 of FIG. 1, however, the wrapper generation tool 110 in system 200 is managed by a customer 208. The customer 208 may use the wrapper generation tool 110 to generate wrappers that are specific to at least one messaging provider that the customer 208 uses, for example.

Figure 3:
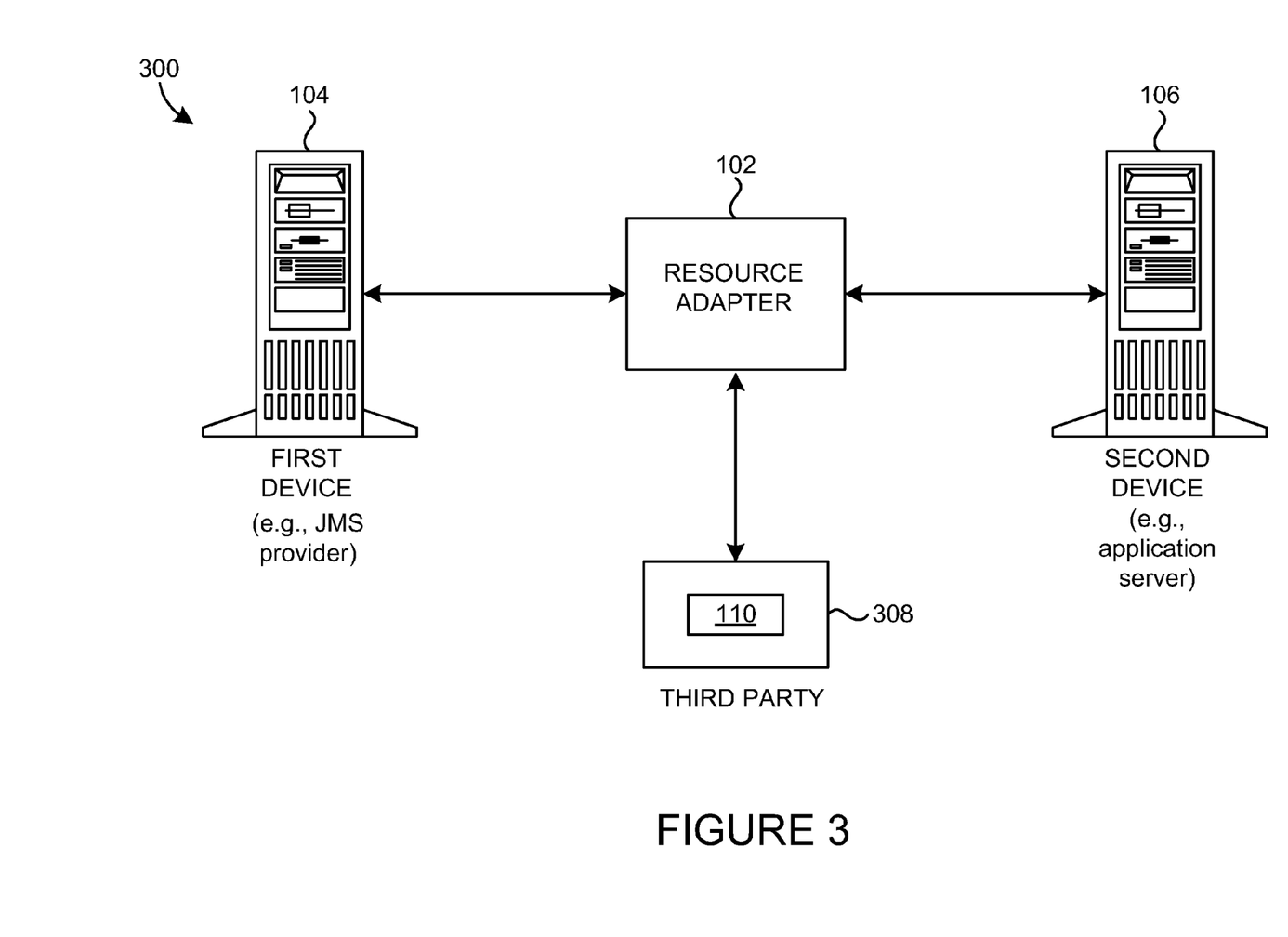
FIG. 3 illustrates a third example of a system in accordance with certain implementations of the disclosed technology.

FIG. 3 illustrates a third example of a system 300 in accordance with certain implementations of the disclosed technology. In the example, the system 300 includes the resource adapter 102, first device 104, and second device 106 of the systems 100 and 200 illustrated by FIGS. 1 and 2, respectively.

Unlike the systems 100 and 200 of FIGS. 1 and 2, respectively, however, the wrapper generation tool 110 in system 300 is managed by a third party 308, e.g., the same third party that provided the messaging provider. The third-party 308 may use the wrapper generation tool 110 to generate a plurality of wrappers, each of which is specific to one of a plurality of messaging providers, for example. The third-party 308 may subsequently supply said wrappers for use with its messaging provider and the resource adapter 102.

Figure 4:
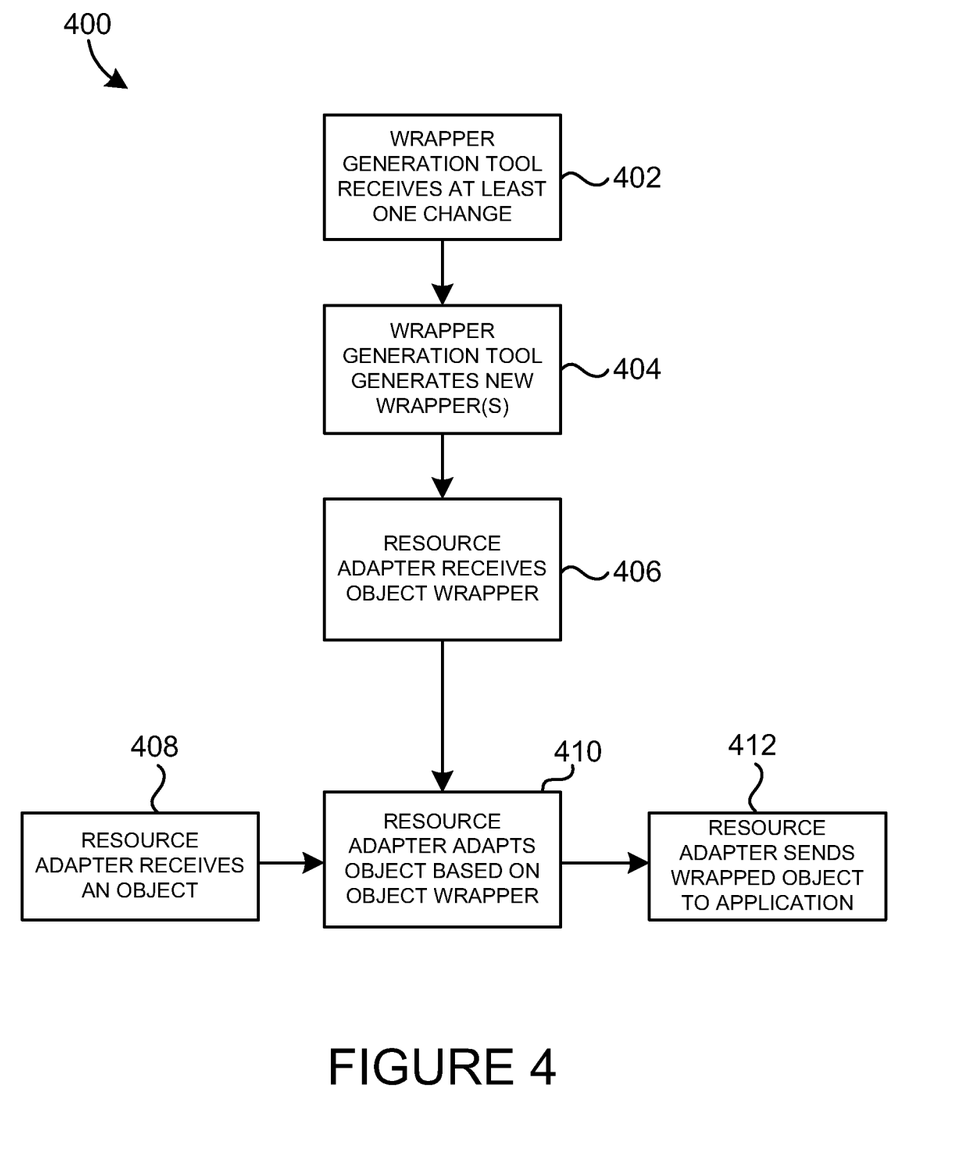
FIG. 4 illustrates an example of a computer-controlled method in accordance with certain implementations of the disclosed technology.

FIG. 4 illustrates an example of a computer-controlled method 400 in accordance with certain implementations of the disclosed technology. At 402, a wrapper generation tool, such as the wrapper generation tool 110 of FIGS. 1-3, may receive at least one change to be made to an object wrapper. The object wrapper may include a plurality of distinct classes and, in certain embodiments, may further include a plurality of extensions. The object wrapper may be specific to at least one from a group of message types consisting of the following: bytes, map, object, stream, and text.

The at least one change may include a new header or at least one new field, for example. At 404, the wrapper generation tool may generate a new object wrapper based on the at least one change received at 402. In certain embodiments, the wrapper generation tool may generate a plurality of new object wrappers based on the at least one change.

At 406, a resource adapter, such as the resource adapter 102 of FIGS. 1-3, may receive at least one object wrapper comprising a plurality of features. At 408, the resource adapter may receive an object, e.g., from a first messaging provider. The object may be one of a group consisting of the following: a message, a topic, a queue, a connection, a producer, a session, or a consumer.

At 410, the resource adapter may adapt the object received at 408 based at least in part on the object wrapper generated at 404. At 412, the resource adapter may send the wrapped object to an application, for example. In certain embodiments, the application may be managed by an application server. In such embodiments, the application may reside on the application server.

The application may subsequently use the wrapped object. For example, the application may invoke a method on the wrapped object. Alternatively, the application may cast the wrapped object to a messaging provider-specific interface.

Figure 5:
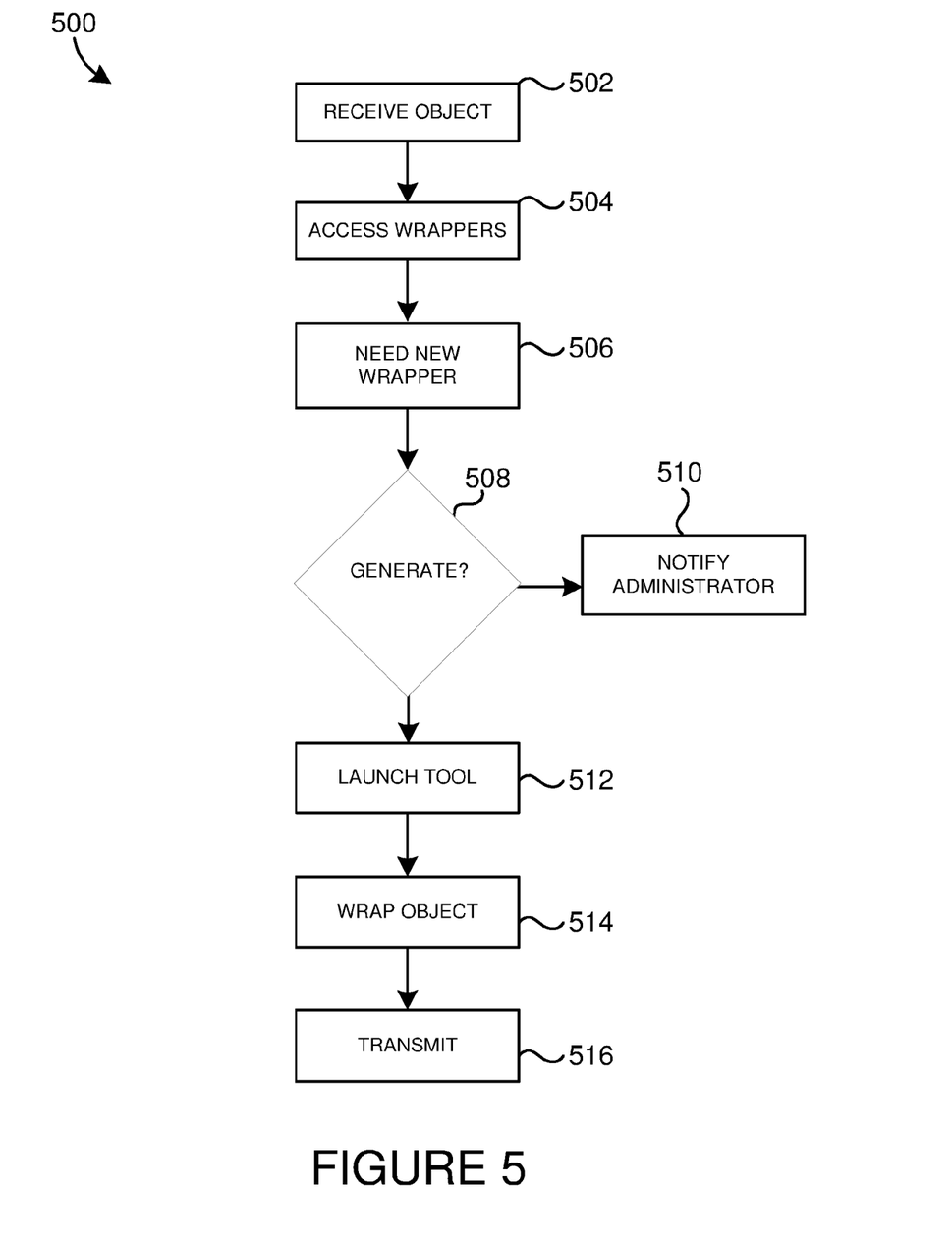
FIG. 5 illustrates an example of another computer-controlled method in accordance with certain implementations of the disclosed technology.

FIG. 5 illustrates another example of a computer-controlled method 500 in accordance with certain implementations of the disclosed technology. At 502, a resource adapter receives an object. At 504, the resource adapter accesses a wrapper library. If the appropriate wrapper is not available, the resource adapter determines that a new wrapper is needed at 506. The resource wrapper determines if it can generate the wrapper at 508, using a dynamic wrapper generation and configuration tool. If the tool can generate the wrapper, it is launched at 512 and wraps and forwards the object at 514 and 516, respectively. If the tool cannot generate the wrapper, the system notifies an administrator at 510 or other entity that the feature cannot be used in the system.

In this manner, the proprietary features of a particular JMS provider can still be deployed, even within the context of a single connector system that applies to multiple JMS providers and multiple application server providers. This reduces the number of situations in which the configuration file needs to be altered or a new wrapper added to the library. In either case, this avoids having to recode, recompile and redeploy the application server used for any particular JMS.

In certain embodiments, a system may include a first device configured to provide an object, a second device hosting an application, a third device hosting a resource adapter configured to receive at least one object wrapper comprising a plurality of features and further configured to receive the object from the provider device, and a fourth device hosting a wrapper generation tool configured to receive at least one change to be made to the at least one object wrapper and further configured to generate a new object wrapper based on the at least one change. The resource adapter may be further configured to adapt the received object based at least in part on the newly generated object wrapper and subsequently send the wrapped object to the application.

In certain embodiments, the third and fourth devices are a single machine. In certain embodiments, the second and third devices are a single machine. In certain embodiments, the first and second devices are a single machine. The first device may be a Java™ Messaging Service (JMS) provider, the second device may be an application server, the third device may be an enterprise server, and the fourth device may be a Java™ Virtual Machine (JVM), for example.

Consider an example in which a provider class implements javax.jms.Connection (a standard JMS interface) and the provider-specific interface com.mycompany.jms.ReconnectableConnectionIntf, which contains a "reconnect( )" method. The resource adapter will know about javax.jms.Connection but have no prior knowledge of the com.mycompany.jms.ReconnectableConnectionIntf interface. When a wrapper generation tool in accordance with the disclosed technology (WrapperGen) is run, the following option is advantageously provided to it:

connection com.mycompany.jms.ReconnectableConnectionIntf

This effectively tells WrapperGen that when it generates the wrapper class for javax.jms.Connection, it should augment that class as needed such that it also implements com.mycompany.jms.ReconnectableConnectionIntf. In this example, the single interface is specified but it should be noted that WrapperGen does not require that all interfaces be specified; rather, a single class or interface which implements all of the desired interfaces may be specified and WrapperGen may advantageously use reflection on the class/interface hierarchy of the specified class/interface to find and implement the entire set of public interfaces implemented by the specified class/interface.

In the example, WrapperGen may create the .class file corresponding roughly to the following:

```
class PREFIXConnection // <-- "PREFIX" comes from a WrapperGen parameter
    extends ConnectionBase // <-- this line is an implementation detail
    implements javax.jms.Connection,
               com.mycompany.jms.ReconnectableConnectionIntf,
{
    // implementation:
```

```
   //
   //       Constructors and any other "glue logic" needed to be interfaced
   //            with the resource adapter may go here.
   //
   //       Methods for implementing javax.jms.Connection methods may go
   //            here, or be inherited, or some combination of the two.
   //
   //       Methods for implementing com.mycompany.jms.ReconnectableConnectionIntf
   //            may go here, specifically this .class file may define an
   //            implementation for the "reconnect( )" method since that method
   //            is part of the com.mycompany.jms.ReconnectableConnectionIntf
   //            interface.
}
```

When the resource adapter creates an instance of the "PREFIXConnection" class (e.g., an instance called "raConnectionWrapper"), it may bind that instance to the provider's Connection object (e.g., an object called "rpConnection").

What is provided to the application is "raConnectionWrapper". The application does not have any way to directly access "rpConnection".

One of the methods in the standard javax.jms.Connection interface is "setClientID(String)". If an application wishes to call setClientID, it does so on the raConnectionWrapper it has. That generally results in the invocation of a setClientID method defined by the resource adapter. The resource adapter may then pass the setClientID request along to the provider by calling setClientID on rpConnection, or the resource adapter may reject the request and throw an exception, or modify some parameters, or call some other provider method(s), for example.

If, instead of calling a standard javax.jms method, the application wishes to call the provider-specific reconnect method, what the application generally must do is take the raConnectionWrapper object, cast it to "com.mycompany.jms.ReconnectableConnectionIntf", and then call "reconnect( )" on it. The reconnect( ) call will execute the generated "reconnect( )" method defined in the generated PREFIXConnection class. That generated resource adapter code then, as described above, may handle the call as it sees fit (e.g., with the typical case being to pass the "reconnect( )" request along to the provider by calling reconnect( ) on rpConnection).

The following discussion is intended to provide a brief, general description of a suitable machine in which embodiments of the disclosed technology can be implemented. As used herein, the term "machine" is intended to broadly encompass a single machine or a system of communicatively coupled machines or devices operating together. Exemplary machines may include computing devices such as personal computers, workstations, servers, portable computers, handheld devices, tablet devices, and the like.

Typically, a machine includes a system bus to which processors, memory such as random access memory (RAM), read-only memory (ROM), and other state-preserving medium, storage devices, a video interface, and input/output interface ports can be attached. The machine may also include embedded controllers such as programmable or non-programmable logic devices or arrays, Application Specific Integrated Circuits (ASICs), embedded computers, smart cards, and the like. The machine may be controlled, at least in part, by input from conventional input devices such as keyboards and mice, as well as by directives received from another machine, interaction with a virtual reality (VR) environment, biometric feedback, or other pertinent input.

The machine may utilize one or more connections to one or more remote machines, such as through a network interface, modem, or other communicative coupling. Machines can be interconnected by way of a physical and/or logical network, such as an intranet, the Internet, local area networks, wide area networks, etc. One having ordinary skill in the art will appreciate that network communication may utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

Embodiments of the disclosed technology may be described by reference to or in conjunction with associated data including functions, procedures, data structures, application programs, instructions, etc. that, when accessed by a machine, may result in the machine performing tasks or defining abstract data types or low-level hardware contexts. Associated data may be stored in, for example, volatile and/or non-volatile memory, such as RAM and ROM, or in other storage devices and their associated storage media, which can include hard-drives, floppy-disks, optical storage, tapes, flash memory, memory sticks, digital video disks, biological storage, and other non-transitory, physical storage media.

Associated data may be delivered over transmission environments, including the physical and/or logical network, in the form of packets, serial data, parallel data, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

We claim:

1. A computer-controlled method, comprising:
   providing a resource adapter with access to at least one object wrapper in a wrapper library, the at least one object wrapper comprising a plurality of features;
   a wrapper generation tool receiving at least one change to be made to at least one of the plurality of features of the at least one object wrapper;
   the wrapper generation tool determining whether it can generate a new object wrapper based on the at least one change to at least one of the plurality of features of the at least one object wrapper;
   responsive to a determination that the wrapper generation tool can generate the new object wrapper based on the at least one change to at least one of the plurality of features of the at least one object wrapper, the wrapper generation tool generating the new object wrapper based on the at least one change;
   responsive to a determination that the wrapper generation tool cannot generate the new object wrapper based on the at least one change to at least one of the plurality of features of the at least one object wrapper, the wrapper generation tool notifying an administrator that the at least one of the plurality of features cannot be used;
   the resource adapter receiving an object from a first messaging provider;
   the resource adapter encapsulating the received object with the newly generated object wrapper; and
   the resource adapter sending the wrapped object to an application.

2. The computer-controlled method of claim 1, wherein the application is managed by an application server.

3. The computer-controlled method of claim 2, wherein the application resides on the application server.

4. The computer-controlled method of claim 1, further comprising the wrapper generation tool generating a plurality of new object wrappers based on the at least one change.

5. The computer-controlled method of claim 1, further comprising:
   a company using the wrapper generation tool to generate a plurality of wrappers, each of which is specific to one of a plurality of messaging providers, the plurality of messaging providers including the first messaging provider; and
   the company supplying said plurality of wrappers for use with the resource adapter and the plurality of messaging providers.

6. The computer-controlled method of claim 1, further comprising:
   a customer using the wrapper generation tool to generate wrappers specific to at least one messaging provider that the customer uses, the at least one messaging provider including the first messaging provider.

7. The computer-controlled method of claim 1, further comprising:
   a third-party using the wrapper generation tool to generate a plurality of wrappers, each of which is specific to one of a plurality of messaging providers, the plurality of messaging providers including the first messaging provider; and the third-party supplies said plurality of wrappers for use with its messaging provider and the resource adapter.

8. The computer-controlled method of claim 1, wherein the object is one of a group consisting of the following: a message, a topic, a queue, a connection, a producer, a session, or a consumer.

9. The computer-controlled method of claim 1, wherein the at least one change comprises a new header.

10. The computer-controlled method of claim 1, wherein the at least one change comprises at least one new field.

11. The computer-controlled method of claim 1, wherein the at least one object wrapper comprises a plurality of distinct classes.

12. The computer-controlled method of claim 11, wherein the at least one object wrapper further comprises a plurality of extensions.

13. The computer-controlled method of claim 1, wherein the at least one object wrapper is specific to at least one from a group of message types consisting of the following: bytes, map, object, stream, and text.

14. The computer-controlled method of claim 1, further comprising the application using the wrapped object.

15. The computer-controlled method of claim 14, wherein using the wrapped object comprises the application invoking a method on the wrapped object.

16. The computer-controlled method of claim 14, wherein using the wrapped object comprises the application casting the wrapped object to a messaging provider-specific interface.

17. One or more non-transitory computer-readable media storing instructions that, when executed by a processor, cause the processor to perform the method of:
   providing a resource adapter with access to at least one object wrapper in a wrapper library, the at least one object wrapper comprising a plurality of features;
   a wrapper generation tool receiving at least one change to be made to at least one of the plurality of features of the at least one object wrapper;
   the wrapper generation tool determining whether it can generate a new object wrapper based on the at least one change to at least one of the plurality of features of the at least one object wrapper;
   responsive to a determination that the wrapper generation tool can generate the object wrapper based on the at least one change to at least one of the plurality of features of the at least one object wrapper, the wrapper generation tool generating the new object wrapper based on the at least one change;
   responsive to a determination that the wrapper generation tool cannot generate the new object wrapper based on the at least one change to at least one of the plurality of features of the at least one object wrapper, the wrapper generation tool notifying an administrator that the at least one of the plurality of features cannot be used;
   the resource adapter receiving an object from a first messaging provider;
   the resource adapter encapsulating the received object with the newly generated object wrapper; and
   the resource adapter sending the wrapped object to an application.

18. A system, comprising:
   a first device hosting a messaging service configured to provide an object;
   a second device hosting an application;
   a third device hosting a resource adapter and having a processor that is configured to cause the resource adapter to receive at least one object wrapper comprising a plurality of features and further configured to cause the resource adapter to receive the object from the first device; and
   a fourth device hosting a wrapper generation tool configured to receive at least one change to be made to at least one of the plurality of features of the at least one object wrapper and further configured to determine whether it can generate a new object wrapper based on the at least one change to at least one of the plurality of features of the at least one object wrapper, generate the new object wrapper based on the at least one change responsive to a determination that the wrapper generation tool can generate the new object wrapper based on the at least one change to at least one of the plurality of features of the at least one object wrapper, and notify an administrator that the at least one of the plurality of features cannot be used responsive to a determination that the wrapper generation tool cannot generate the new object wrapper based on the at least one change to at least one of the plurality of features of the at least one object wrapper, wherein the resource adapter is further configured to encapsulate the received object with the newly generated object wrapper and subsequently send the wrapped object to the application.

19. The system of claim 18, wherein the third and fourth devices are a single machine.

20. The system of claim 18, wherein the second and third devices are a single machine.

21. The system of claim 18, wherein the first and second devices are a single machine.

22. The system of claim 18, wherein the second device is an application server.

23. The system of claim 18, wherein the third device is an enterprise server.

* * * * *

UNITED STATES PATENT AND TRADEMARK OFFICE
CERTIFICATE OF CORRECTION

PATENT NO. : 9,456,017 B2
APPLICATION NO. : 13/872797
DATED : September 27, 2016
INVENTOR(S) : Steidl et al.

It is certified that error appears in the above-identified patent and that said Letters Patent is hereby corrected as shown below:

In the Claims

In Column 8, Line 38, in Claim 17, after "generate the" insert -- new --.

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*